US008556700B1

(12) United States Patent
Wolf

(10) Patent No.: US 8,556,700 B1
(45) Date of Patent: Oct. 15, 2013

(54) COMPUTER-BASED METHODS AND APPARATUS FOR LOTTERY-STYLE GAME SUITABLE FOR IMPLEMENTATION ON SOCIAL NETWORK

(75) Inventor: William M. Wolf, Newport Beach, CA (US)

(73) Assignee: William M. Wolf, Newport Beach, CA (US)

( * ) Notice: Subject to any disclaimer, the term of this patent is extended or adjusted under 35 U.S.C. 154(b) by 0 days.

(21) Appl. No.: 13/590,352

(22) Filed: Aug. 21, 2012

Related U.S. Application Data

(60) Provisional application No. 61/686,960, filed on Apr. 16, 2002.

(51) Int. Cl.
*A63F 9/24* (2006.01)
*A63F 13/00* (2006.01)

(52) U.S. Cl.
USPC .................................. 463/17; 463/16; 463/22

(58) Field of Classification Search
USPC .................................................................. 463/17
See application file for complete search history.

(56) References Cited

U.S. PATENT DOCUMENTS

| | | | | |
|---|---|---|---|---|
| 4,815,741 | A * | 3/1989 | Small | 463/17 |
| 6,086,477 | A | 7/2000 | Walker et al. | |
| 6,267,670 | B1 * | 7/2001 | Walker et al. | 463/17 |
| 6,277,026 | B1 * | 8/2001 | Archer | 463/42 |
| 6,296,569 | B1 * | 10/2001 | Congello, Jr. | 463/17 |
| 6,454,650 | B1 * | 9/2002 | Aronin | 463/17 |
| 6,840,857 | B2 | 1/2005 | Ghela | |
| 7,780,514 | B2 | 8/2010 | Walker et al. | |
| 8,012,013 | B2 | 9/2011 | Walker et al. | |
| 8,042,809 | B2 | 10/2011 | Walker et al. | |
| 8,075,382 | B2 | 12/2011 | Wolf | |
| 8,078,741 | B2 | 12/2011 | Barnfield et al. | |
| 8,100,749 | B2 | 1/2012 | Walker et al. | |
| 8,112,314 | B2 | 2/2012 | Patel et al. | |
| 8,117,080 | B1 | 2/2012 | Ban et al. | |
| 8,150,439 | B2 | 4/2012 | Vengroff et al. | |
| 8,150,844 | B2 | 4/2012 | Redstone et al. | |
| 8,150,851 | B2 | 4/2012 | Jones | |
| 2003/0003984 | A1 * | 1/2003 | Petruzzi | 463/17 |
| 2004/0097283 | A1 * | 5/2004 | Piper et al. | 463/17 |
| 2005/0003884 | A1 * | 1/2005 | Meyer et al. | 463/17 |

(Continued)

OTHER PUBLICATIONS

[No Author Listed] American lotteries; Modern lotteries around the world. History of Lottery.com. Retrieved from <historyoflottery.com>. 2 pages.

[No Author Listed] History of games. Wikipedia. Retrieved from <http://en.wikipedia.org/wiki/History_of_games> on Apr. 12, 2013. Article last modified Jan. 26, 2013. 9 pages.

(Continued)

*Primary Examiner* — Tramar Harper
(74) *Attorney, Agent, or Firm* — Nutter McClennen & Fish LLP; David J. Powsner

(57) ABSTRACT

Methods and apparatus of gaming implementable on or in connection with a computer social network prose for accepting entries, until a volume of those entries exceeds a prescribed limit; generating a winning value; identifying one or more of the entries nearest the winning value; and designating one or more of the entries nearest the winning value as winning entries. The entries can be accepted from one or more contestants and/or they can be generated on behalf of those contestants. Each of the entries can comprise one or more values from a predefined enumeration of values. That enumeration of values can, according to related aspects of invention, comprise values, each between a low numerical value and a high numerical value.

17 Claims, 5 Drawing Sheets

(56) References Cited

U.S. PATENT DOCUMENTS

| | | | | |
|---|---|---|---|---|
| 2005/0064930 A1* | 3/2005 | Jubinville et al. | ............... | 463/17 |
| 2006/0172793 A1* | 8/2006 | Desposito | ....................... | 463/17 |
| 2007/0238501 A1* | 10/2007 | Blass | .............................. | 463/10 |

OTHER PUBLICATIONS

[No Author Listed] Lottery. Wikipedia. Retrieved from <http://en.wikipedia.org/wiki/Lottery> on Apr. 12, 2013. Article last modified Apr. 11, 2013. 14 pages.

* cited by examiner

INITIAL SCREENING

ACCEPT AND PROCESS ENTRY

CLOSURE

COMPUTER-BASED METHODS AND APPARATUS FOR LOTTERY-STYLE GAME SUITABLE FOR IMPLEMENTATION ON SOCIAL NETWORK

This application claims the benefit of filing of U.S. Patent Application Ser. No. 61/686,960, entitled A COMPUTER-ENABLED LOTTERY ADDRESSED TO SOCIAL SERVICE NETWORKS, filed Apr. 16, 2012, the teachings of which are incorporated herein by reference.

BACKGROUND OF THE INVENTION

This application pertains to gaming and, more particularly, by way of non-limiting example, to methods and apparatus for lottery-style games adapted for use, among other applications, with online social networks and with other networked digital data processing environments.

According to wikipedia.com, publicly run lotteries date back to the Chinese Han Dynasty, a few centuries before the common era. Homer's Iliad makes reference to them (notably, in the form of drawing lots for battle), as do early Celtic texts. The modern lottery finds basis in fund-raising efforts by governments in and around the Netherlands, in the 15th Century and later.

Lotteries appear to have suffered a spotty history in the United States. According to historyoflottery.com, these were a significant means of fund-raising in the American colonies. By the 19th century, however, corruption was rampant, leading to a federal ban at the start of the 20th century. That was then, and now is now. In the U.S. alone, lotteries are run by the majority of states. Indeed, as we enter well into the 21st century, Internet-based lotteries are coming to the fore.

The history of gaming, as a more general category of human pursuit, is far richer than that of lotteries. Turning again to Wikipedia, the "history of games dates to the ancient past. Games are an integral part of all societies. Like work and relationships, they are an expression of some basic part of the human nature." More simply put, games have and will be with us for a while whether for entertainment, monetary reward or otherwise.

The recent emergence of social networks (Facebook, et al) enables a new and improved method of rapid and secure communicating with network members. Ecosystems of members, vendors and others have grown around portals and other interfaces provided with those networks. Still, present-day social networks do not meet all the needs of their respective communities.

In view of the foregoing, an object of the invention is to provide methods and apparatus for gaming.

A related object is to provide such methods and apparatus as are adapted for use, among other applications, with online social networks (a/k/a social networking sites, social networking portals, computer social networks, and so forth) and other networked digital data processing environments.

SUMMARY OF THE INVENTION

The foregoing are among the objects attained by the invention, which provides in one aspect, a method of gaming, e.g., implementable on or in connection with a computer social network, that includes accepting entries, until a volume of those entries exceeds a prescribed limit; generating a winning value; identifying one or more of the entries nearest the winning value; and designating one or more of the entries nearest the winning value as winning entries.

According to related aspects of the invention, the entries can be accepted from one or more contestants and/or they can be generated on behalf of those contestants.

Other aspects of invention provide methods and apparatus, e.g., as described above, in which each of the entries comprises one or more values from a predefined enumeration of values. That enumeration of values can, according to related aspects of invention, comprise values that are each between a low numerical value and a high numerical value.

Further related aspects of the invention provide methods and apparatus, e.g., as described above, in which the step of accepting entries comprises accepting, as each such entry, one or more values from a predefined enumeration of values that include a low numerical value of one and a high numerical value of 49.

Still other aspects of the invention provide methods and apparatus, e.g., as described above, in which the step of accepting entries comprises accepting, as each such entry, a fixed number of numerical values, where that fixed number is between three numerical values and six numerical values, inclusive.

Yet still further aspects of the invention provide methods and apparatus, e.g. as described above, in which the step of accepting entries comprises accepting, as each such entry, one or more values from a predefined enumeration of values, where the one or more values that make up each entry together define a value from a set of possible values; and, where acceptance of entries is discontinued when a volume thereof exceeds a prescribed limit that is a fraction—e.g., a small fraction—of a number of values in the set of possible values.

In a related aspect, the invention provide methods and apparatus, e.g., as described above, in which the step of accepting entries comprises accepting, as each such entry, six values, each ranging from 1 to 49, inclusive; and, where acceptance of entries is discontinued when a volume thereof exceeds 100,000.

Further aspects of the invention provide methods and apparatus, e.g., as described above, in which the step of identifying one or more of the entries nearest the winning value includes reordering within each entry the plurality of values making up that entry.

Still further aspects of the invention provide methods and apparatus, e.g., as described above, in which the step of generating the winning entry includes generating, as the winning value, a plurality of values from a predefined enumeration of values, and further includes reordering within the winning value the plurality of values making up that value.

Yet still further aspects of the invention provide methods and apparatus, e.g., as described above, in which the step of designating one or more entries as winning entries includes assigning a value for each winning entry in accord with its relative closeness to the winning value.

Still further aspects of the invention provide methods and apparatus as described above that include notifying contestants from whom winning entries were accepted. In related aspects, that notification can include a monetary award, e.g., based on the total of entry fees paid with each iteration.

Other aspects of the invention provide methods and apparatus, e.g., as described above, in which the aforementioned steps are iterated-through a plurality of times, with each iteration resulting in designation of winning entries that are independent of those resulting from another such iteration.

Related aspects of the invention provide methods and apparatus, e.g., as described above, in which the step of accepting an entry includes accepting, as an entry for a current iteration, an entry that had not been accepted as an entry in a prior iteration on account of its exceeding the prescribed limit of entries in that prior iteration.

These and other aspects of invention are evident in the text that follows and in the drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
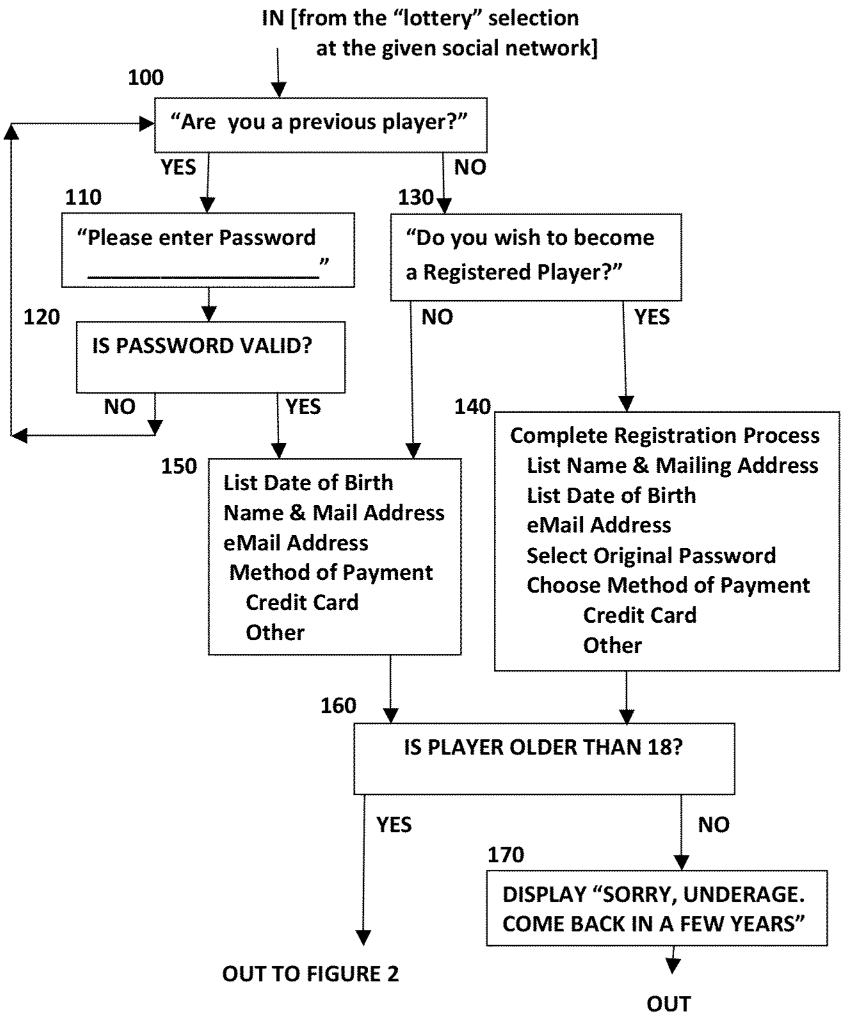
FIG. 1 depicts a methodology for initial screening of players in an apparatus according to the invention.
Figure 2:
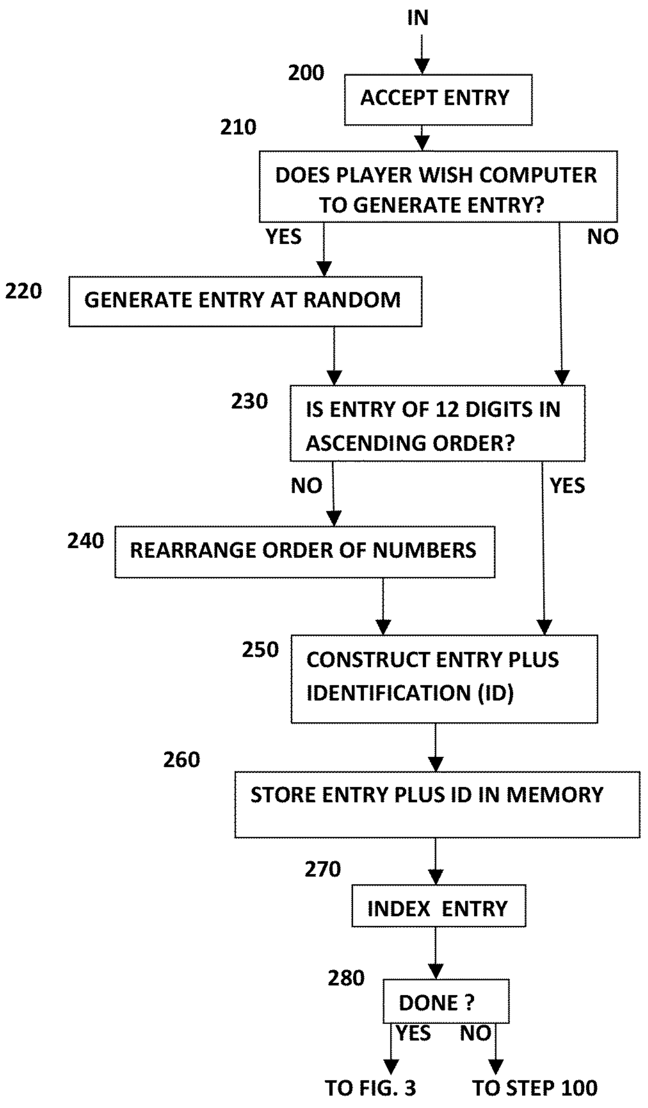
FIG. 2 depicts a methodology for accepting and processing entries in an apparatus according to the invention.

FIGS. 1-5 are flowcharts depicting a methodology for operation of apparatus for gaming—and, particularly, of running a lottery-style game (hereinafter, simply, "lottery")—according to the invention. Although such methodology can be executed in a variety of environments, the illustrated embodiment is addressed to satisfy the confluence of the current proliferation of computer social networks with the desire of some members to participate in a lottery.

More particularly, the recent emergence of social networks (Facebook, et al) enables a new and improved method of rapid and secure communicating with network members. To satisfy the risk-taking proclivities of this audience, new methodologies and apparatus of gaming have been invented. The unique methods and apparatus guarantee that a volume-based rather than time-based lottery will distribute winnings every time the lottery operates. Typical lotteries operate for a specified period of time and lead to disappointment when results are not satisfied (no one wins). The methodologies and apparatus described herein guarantee successful performance (a number of winners) each time the lottery operates. Thus client satisfaction is heightened leading to renewed entries. Furthermore, player identification is tracked leading to the elimination of such traumas as lost tickets and misidentification of winners. Thus the lottery is not time-related but volume-related. Other unique features are described herein.

Methodology

A method of running a lottery according to some practices of the invention includes the steps outlined below (one or more of which may be excluded from and/or additional ones of which may be included in other practices). These steps may be executed on one or more networked digital data processing devices (e.g., desktop computers, laptop computers, servers, mobile phones, personal digital assistants, etc.) of the type commercially available in the marketplace via software operated in accord with the teachings hereof, and they may be executed in connection with other software—for example, social networking portal software, social networking apps, web browsers, and so forth, all by way of non-limiting example. Thus, for example, referring to FIG. 5, in the illustrated embodiment, the steps are executed by a server that is networked (e.g., via the Internet) and interacts with users of client devices (here, desktop computers, mobile phones, etc.) via social networking portal software (on the server) and web browsers (on the client devices) to enable those users (who may, for example, be members of the social network) to participate in a lottery in accord with the teachings hereof.

A high level of security is preferably maintained throughout such execution and in connection with transmissions between the devices. This includes, by way of non-limiting example, securing the data bank of entries including their IDs, the generation of random numbers, the transmission of all lottery information computer to computer as required to facilitate operations.

Steps

1. The lottery operates continuously as a series of one and, preferably, of plural sequential iterations.
2. For each iteration, entries are accepted until a prescribed limit has been reached, termed Lmax.
3. When Lmax is reached, that iteration is closed and subsequent entries are channeled into the next iteration for processing.
4. Each entrant selects, for each entry, one or more values from a predefined enumeration of values. For example, in the illustrated embodiment, each entry comprises six numerical values, each between one and forty nine. An entrant creates an entry by selecting those values and submits this entry together with associated personal information plus an entry fee. Alternatively, the entrant may choose to have a computer—e.g., the entrant's own computer, a server, or otherwise—randomly select a set of six two-digit numbers to form an entry.
5. Instead of operating for a fixed period of time, the enrollment period is volume-dependent. That is, when the fixed, preset lottery amount is fully subscribed, the current iteration of the lottery is closed; the winners are determined and announced; and all of the winning funds pool are distributed.
6. When one lottery iteration has been filled and is closed, another is opened and entries are accepted until the prescribed amount is accumulated at which time the subsequent lottery amount is filled and closed, etc.
7. The payout of each lottery iteration can be based on the entry fee and number of entries accepted. For sake of example, it is assumed that entries are priced at $1 each and that 100,000 entries are accepted for each iteration of the lottery. In that case, the payout is $100,000 (minus an administrative fee, if any), divided among the winner(s), e.g., in accord with the closeness of their respective entries to the winning number, e.g., as determined below.

Processing of Entries

Each entry of the illustrated embodiment comprises 12 numerical digits, and it may be accompanied by a 12-digit identifier that identifies the contestant who placed the entry and/or on behalf of whom the entry was great was placed. (In addition, each entry may be accompanied by an entry fee (e.g., $1, $5, etc) determined by the system administrator, etc.) The 12-digit entry, in turn, comprises six pairs of two-digit numbers (each pair of which is referred to herein as an "element"), each pair of which falls between a numerical minimum and maximum, here, 01 and 49. Other embodiments may vary as to the length of each entry and/or it's elemental makeup (including the numerical range within which each element may fall). Likewise, other embodiments may vary as to the inclusion of identifiers, their length and/or make up.

The entries may be processed as they are accepted; processing of entries for the current iteration may be deferred until all are accepted; or otherwise.

The first step of processing the entries for the current iteration is to sort all elements of each entry. In the illustrated embodiment, they are sorted and stored in sequential order. For example, if an entry comprises the 12-digit "number," for example:

06 30 23 15 03 it is reordered numerically so that the numerically smallest pair is at one end and the numerically largest pair is at the other end, e.g., as follows:

03 06 15 23 30

The processed entries may be stored (e.g., to an array, a file, a linked list, or otherwise) for subsequent batch comparison with the winning value and/or they may be compared with the winning value as they (the individual entries) are processed.

Generating a Winning Value

The next step is to randomly generate a winning entry for the current iteration. As with each entry, in the illustrated embodiment the winning value comprises six pairs of numerical digits (each pair of which, too, is referred to herein as an "element"), each pair of which falls between a numerical minimum and a numerical maximum—here again, 01 and 49. Other embodiments may vary as to the length of the winning value and/or it's elemental makeup (including the numerical range within which each element may fall).

In the illustrated embodiment, generation of the winning entry, thus, can comprise generating a random 12-digit number, alternatively, generating six pairs of random two-digit numbers, and so forth. Any of many methods known in the art for generating random numbers may be employed. A rudimentary method is to begin with a published table of random numbers and select two digits at random. In an embodiment where each element of the winning value is between 00 and 49, for example, 49 is subtracted from any element whose value is 50 or greater. For example, if a randomly generated number is

0679236403 made up of the pairs 06 79 23 64 03 the winning number will consist of the following six pairs of numbers 06 30 23 15 03, which when reordered numerically are 03 06 15 23 30

This is the randomly generated winning number in this example for an iteration of the lottery.

Identifying Winning Entry(ies)

The next step is to compute which of the entries are closest to this winning number. In the illustrated embodiment, this includes designating one or more entries as winning entries and assigning a value (e.g., a monetary award) to each in accord with its relative closeness to the winning number. In an iteration of the lottery that accepts 100,000 entries, for example, the step of identifying winning entries is implemented by searching to find seven entries closest to the generated winning number, and awarding each a share of the entry fee pool (e.g. minus administrative costs, etc.) in accord with its closeness, for example, as follows:

| Rank | Award Amount |
|---|---|
| Closest Entry | $50,000 |
| $2^{nd}$ Closest | 10,000 |
| $3^{rd}$ Closest | 5,000 |
| $4^{th}$ Closest | 4,000 |
| $5^{th}$ Closest | 3,000 |
| $6^{th}$ Closest | 2,000 |
| $7^{th}$ Closest | 1,000 |

Other embodiments may identify a lesser or greater number of winning entries, e.g., one, ten, 100, and so forth. Moreover, the share of the entry fee pool may be divided other than as shown in the table above.

In the event that there are ties, the awards can be halved. If there are 3 or more same winning numbers the award can be split proportionately. The remainder of the funds wagered can be distributed to cover administrative costs plus funding of worthwhile causes, as appropriate.

The next step is notifying the contestants who made (or on behalf of whom were made) the winning entries, as well as the amount (if any) awarded. Customary methods for facilitating payments of winnings are utilized. These include credit and debit card handling. Payment of winnings can be made by issuance of company checks to the lottery winners. Certified mail can ensure proper delivery to participants.

Additional Details

A more complete understanding of methods and apparatus for execution of a lottery in accord with the invention may be attained by reference to FIGS. 1-5 and the discussion that follows. The term "computer" is used here to refer to the one or more devices employed, in a given embodiment, for running of the lottery. In some embodiments, this may be a single computer or other digital data device (e.g., desktop computer, laptop computer, mobile phone, personal digital assistant, etc.) upon which the user executes software constructed and operated in accord with the teachings hereof for running such a lottery. In other embodiments, this may be include one or more other additional computers/data devices, such as, for example, one or more servers (e.g., by way of non-limiting example, of the type that additionally run social networking portal software). See FIG. 5 and the discussion in regard to thereto, above. Likewise, in the discussion that follows, the term "lottery program" refers to software executing on one or more of those computers for implementing a lottery-style game in accord with the teachings hereof.

Initial Screening

Referring to FIG. 1, the lottery program begins by the computer asking the player "Are you a previous player?", Step 100.

If the answer to this question is YES, the computer requests, Step 110, the player's password. Next, Step 120, the computer tests the validity of the player's entered password. If unable to confirm the validity, the computer reverts to Step 100 under the presumption that the player erred on input so it returns to the beginning In further refinements of this invention the program may interrogate the player, asking if the player forgot his/her password and wants a reminder, etc.

If the answer to the question of Step 100 is negative the program then asks, Step 130, "Do you wish to become a Registered Player?" If the answer is YES, a Registration Process commences, Step 140, which includes personal information including the address to which winnings should be mailed.

If the answer to the question of Step 130 is NO, the process proceeds to Step 150 wherein personal data pertinent to the method of payment and information for addressing any winning payments are requested.

Next the entered date of birth is examined, Step 160. If the player is younger than age 18, his entry is rejected. If the Date of Birth entry, queried in Step 160, states that the player is 18 or older, then the play proceeds to the methods of FIG. 2.

Accept and Process Entry

The computer next Accepts Entry, Step 200. The computer first interrogates the entry, Step 210, to determine whether or not the player wishes the computer to make a selection. If so, the computer will effect a random pick of numbers, Step 220.

If not, the player's entry is interrogated to determine whether or not there are 6 pairs of 2 digits each in ascending order, Step 230. If NO, the computer then rearranges the order of the selected numbers, Step 240, such that each of the 2 digit numbers is in ascending order. The computer then progresses to Step 250, where the rest of the entry is constructed. This includes constructing the six digit entry Identification number, a sequential value numbering the entry from 1 to LMax where LMax is the total number of entries to be accepted for this iteration. At the front of this number is placed a six digit representation of the date.

A typical entry then looks like: 02 13 24 33 40 48 followed by 120413 003141

Where the first 12 digits represent the player's entry or wager; the next six represent the date; and the last six are the sequential identification of this player.

Following the construction of this bettor's entry it is stored in a computer data bank for future reference, Step 260.

The entry parameters are then indexed, Step 270, and the questions is asked, Step 280, Is this iteration of the lottery Done? In other words has the limit, LMax, been reached? If NO, control reverts back to Step 100, where the next entry is accepted. If the answer is YES, the computer progresses to Step 300.

In the illustrated embodiment, LMax is set (by a system administrator, etc) such that acceptance of entries for a current iteration is discontinued when a volume of entries therefore exceeds a prescribed limit that is a fraction—e.g., a small fraction—of a number of values in the set of possible values. For example, in an embodiment of the type described above in which the winning number and the entries each comprise six pairs of two-digit numbers between 01-49, the size of the set of possible values is between 49!/(6!*43!) and 49!/43!—i.e., between 13,983,816 and 10,068,347,520—LMax is set to limit the number of entries in each iteration to 100,000. Other embodiments may vary in this regard.

The computer then progresses to the Winning Numbers computation, next section.

Winning Numbers Construction

Figure 3:
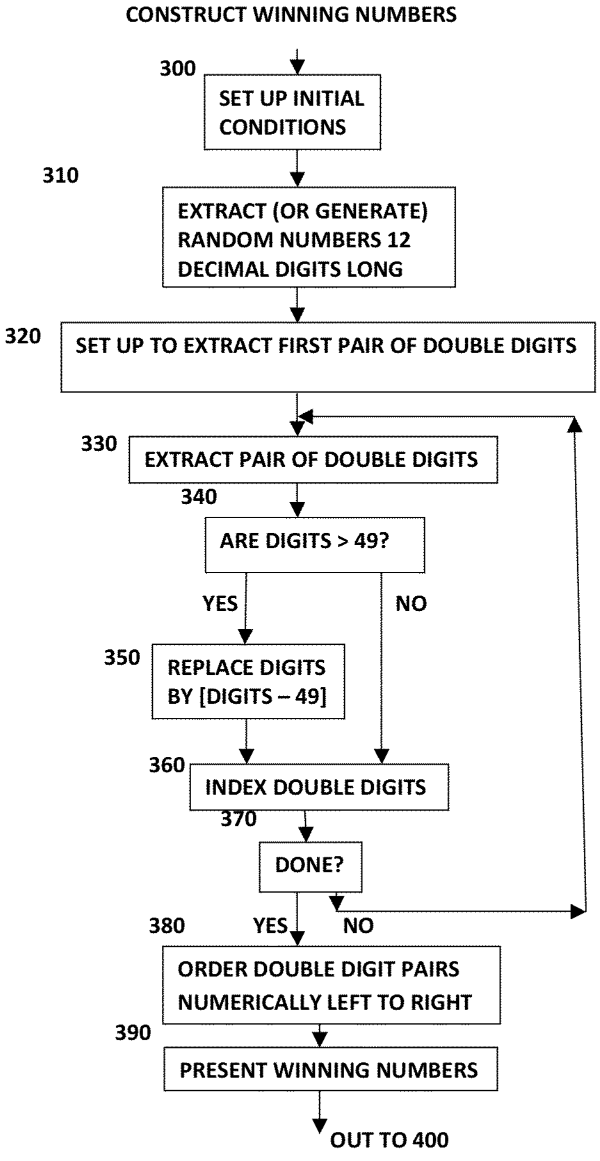
FIG. 3 depicts a method for a methodology for generating winning values in an apparatus according to the invention.
Figure 4:
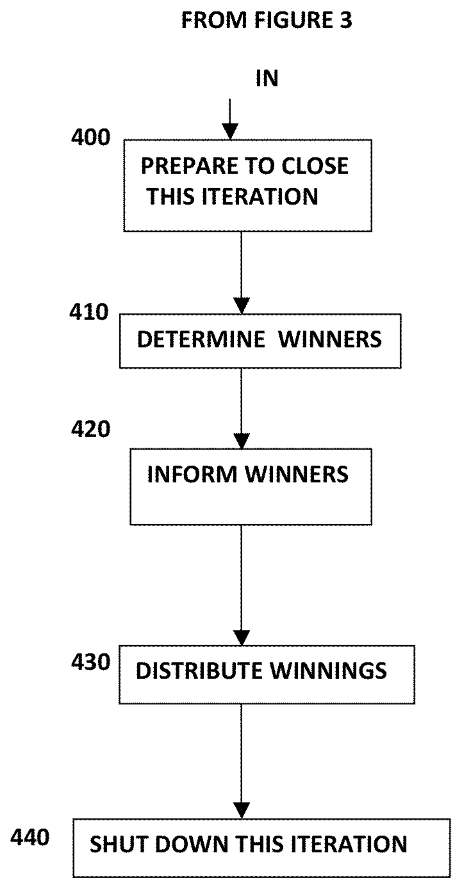
FIG. 4 depicts a methodology for closing an iteration of a lottery in an apparatus according to the invention.
Figure 5:
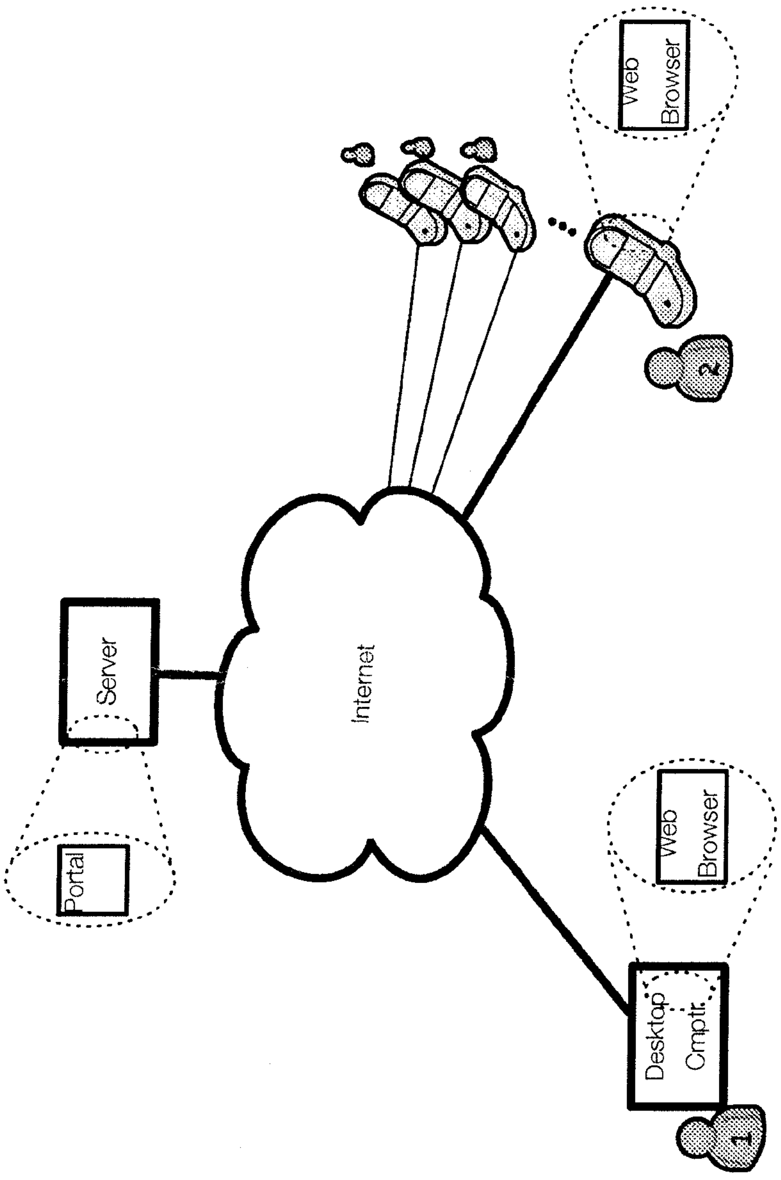
FIG. 5 depicts a networked environment of computers and other digital data devices for running a lottery-style game according to the invention.

Referring to FIG. 3, the first step, Step 300, is to Set Up the initial conditions for this set of computations. The first computation, Step 310, is to extract or generate random numbers 12 digits in length. This represents the six double digits of the winning configuration. In Step 330, the six sets of double digits, in order, are tested to see if they are >49. If YES, then in Step 350, the set of double digits are replaced by the digits less 49.

Following this replacement, and if the answer to the Step 340 question is NO, then the double digits are indexed to the next set, Step 360.

Next, Step 370, the question is asked, "Are all six sets of double digits processed?" If NO, control reverts back to Step 330. If YES, control progresses to Step 380 whereby the six pairs of double digits are ordered, numerically, left to right. Finally, Step 390, the winning numbers are presented as six sequential pairs of number of progressively higher value. These constitute the winning combination.

Closure

This iteration terminates in the next section, CLOSURE. In Step 410, the Winning Numbers are designated and the winners are determined.

The winners are informed, Step 420, and the winnings are distributed, Step 430. Finally, this iteration of this lottery is shut down, Step 440.

Described above are methods and apparatus for gaming in accord with embodiments of the invention. It will be appreciated that description and the accompanying drawings are merely examples of methods and apparatus according to the invention, and that other embodiments that vary from those shown and described here fall within the scope of the invention. Thus, for example, while the illustrated embodiment accepts entries that are comprised of six pairs of two-digit values, other embodiments may accept entries of other forms, sizes and formats.

In view thereof, what I claim is:

1. A method of gaming, comprising:

executing on a set of one or more computers the steps of:

A. accepting one or more entries for a current round from each of a plurality of contestants, where the accepting step comprises accepting, as each said entry, one or more values from a predefined enumeration of values, B. discontinuing accepting entries from the plurality of contestants for the current round when a combined volume of entries received therefrom exceeds a prescribed limit, C. when the prescribed limit is reached, generating a winning value for the current round, where the generating step includes generating, as the winning value, a plurality of values from the predefined enumeration of values, where at least one of those plurality of values is generated as a random value outside the predefined enumeration of values, wherein said random value is algebraically manipulated so that it falls within the predefined enumeration of values, D. identifying one or more of the entries for the current round nearest the winning value, where the identifying step includes reordering within each entry the plurality of values making up that entry and reordering within the winning value the plurality of values making up that value, and E. designating one or more of the entries nearest the winning value as winning entries for the current round.

2. The method of claim 1, where step (B) comprises channelling for use in a subsequent round one or more entries received after the combined volume of entries received for the current round exceeds the prescribed limit.

3. The method of claim 1, where step (A) comprises generating one or more entries on behalf of each of one or more contestants.

4. The method of claim 1, where step (A) comprises accepting, as each said entry, one or more values from a predefined enumeration of values.

5. The method of claim 4, where step (A) comprises accepting, as each said entry, a plurality of values, each between a low numerical value and a high numerical value.

6. The method of claim 5, where the low numerical value is 1 and the high numerical value is 49.

7. The method of claim 5, where step (A) comprises accepting, as each said entry, a fixed number of numerical values, where that fixed number is between three numerical values and six numerical values, inclusive.

8. The method of claim 1, where step (A) comprises accepting, as each said entry, one or more values from a predefined enumeration of values, where those one or more values that make up each entry together define a value from a set of possible values, and where step (B) comprises discontinuing accepting entries when a volume thereof exceeds a prescribed limit that is a fraction of a number of values in the set of possible values.

9. The method of claim 8, where the prescribed limit is a small proportion of the number of values in the set of possible values.

10. The method of claim 8, where step (A) comprises accepting, as each said entry, a six values, each ranging from 1 to 49, inclusive, and where step (B) comprises discontinuing accepting entries when a volume thereof exceeds 100,000.

11. The method of claim 1, wherein step (E) comprises assigning a value for each winning entry in accord with its relative closeness to the winning value.

12. The method of claim 1, comprising notifying contestants from whom winning entries were accepted.

13. The method of claim 1, comprising iterating steps (A)-(F) a plurality of times, with each iteration resulting in designation of winning entries that are independent of those resulting from another such repetition.

14. The method of claim 13, wherein step (A) includes accepting as an entry for a current iteration of steps (A)-(F) an entry that had not been accepted as an entry in a prior iteration on account of its exceeding the prescribed limit of entries in that prior iteration.

15. The method of claim 13, wherein step (A) includes accepting as entries for a second iteration of steps (A)-(F) one or more entries that had been received after the prescribed limit is exceeded in a first iteration of those steps.

16. The method of claim 1, wherein step (A) includes accepting a fee along with each entry and wherein step (E) comprises assigning a reward, to be paid from fees collected in step (A) for each winning entry in accord with its relative closeness to the winning value.

17. The method of claim 1, where step (C) includes subtracting a fixed value from the random value in order to algebraically manipulate it so that it falls within that predefined enumeration.

* * * * *